UNITED STATES PATENT OFFICE.

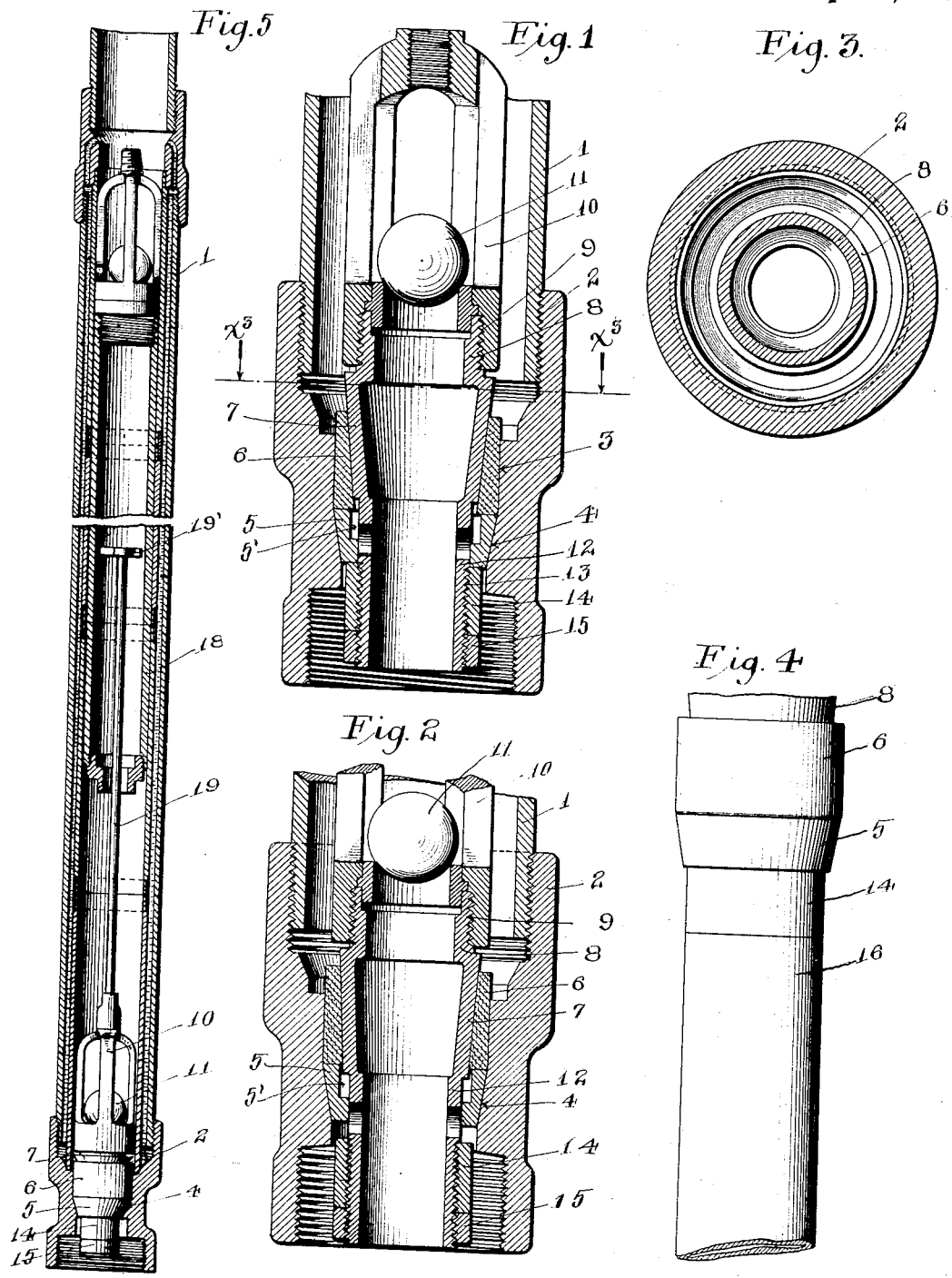

DANIEL DANIELS AND LYSLE P. BURGESS, OF LOS ANGELES, CALIFORNIA.

EXPANDING SLEEVE FOR STANDING VALVES.

1,039,496.  Specification of Letters Patent. Patented Sept. 24, 1912.

Application filed March 25, 1912. Serial No. 686,177.

*To all whom it may concern:*

Be it known that we, DANIEL DANIELS and LYSLE P. BURGESS, citizens of the United States, residing at Los Angeles, in the county of Los Angeles and State of California, have invented a new and useful Expanding Sleeve for Standing Valves, of which the following is a specification.

This invention relates to means for holding in position the standing valves for working barrels of well pumps.

In oil and water well pumps it is usual to provide a sleeve on the body of the standing valve which is intended to fit within the shoe of the working barrel, so as to support the standing valve in position and give a water tight joint. Such sleeves are formed in their final shape before insertion in the barrel and as the recesses for receiving same in the working barrel unavoidably vary to some extent, the sleeves rarely fit with any degree of tightness, so that a water, oil or gas tight joint is not provided. Moreover, the wear on the sleeve causes a continual loosening thereof so that it becomes less and less tight.

The main object of the present invention to provide a sleeve which will be expanded against its seat or recess so that an absolutely tight joint is formed and the standing valve is held rigidly in position.

Other objects of the invention will appear hereinafter.

The accompanying drawings illustrate an embodiment of the invention, and referring thereto: Figure 1 is a vertical section of the standing valve, showing the position of the sleeve and the expansion thereof. Fig. 2 is a similar view showing the sleeve in expanded condition. Fig. 3 is a section on line $x^3-x^3$ in Fig. 1. Fig. 4 is a side elevation of the sleeve and the sliding stop ring therefor, and the valve body showing the application to the valve body of a gas trap in place of a lock nut. Fig. 5 is a vertical section of a working barrel showing the standing valve in position therein.

1 designates the outer casing of a working barrel which is screwed into a shoe 2 adapted to receive the standing valve. Said shoe is tubular and provided with a cylindrical recess 3 and with a frusto conical or tapered downward extension 4 from said recess 3. A sliding ring 5 is adapted to seat on the taper portion 4 of the recess and serve as a stop for the expansion ring. The sleeve 6 may be cylindrical on its outer face and is downwardly tapering or conical on its inner face to fit a correspondingly tapering portion 7 of the valve body 8. Said sleeve 6 is of Babbitt or other suitable metal or material expansible or deformable under heavy pressure but of sufficient rigidity to withstand the strains occurring in operation. Said valve body is tubular and is provided at its upper end with a screw-threaded portion 9 to receive and engage the cage 10 for holding the valve ball 11 in position. The lower end of the valve body is provided with a downward extension 12 somewhat smaller in diameter than the small end of the tapering portion 7 and screw-threaded as at 13 to receive a nut 14. A lock nut 15 may be screwed on the valve body below the nut 14, or if desired, a section of pipe as indicated at 16 in Fig. 4, may be screwed on in place of said lock nut to serve as a gas trap. The ring 5 is recessed as at 5' to permit downward passage of the taper portion 7 of the valve body thereinto in the expanding operation.

In assembling the parts the sleeve 6 is slipped over the valve body and onto the taper portion 7 thereof, and the sliding ring 5 is then slipped over the valve body to rest against the lower end of said sleeve 6. Nut 14 is then screwed onto the valve body to retain the ring 5 in position on the valve body and the nut 15 or gas trap 16 then screwed in position. The valve body is then inserted within the shoe 2 with the tapering face of the ring 5 resting against the tapering seat 4, forming a positive stop for the sleeve 6. On subsequently bringing pressure on the valve, for example, in the manner hereinafter set forth, so as to force the valve body 8 downwardly, the taper portion 7 thereof expands the sleeve 6 so as to force the same into tight contact with the wall of the recess 3 to secure the valve firmly in position and make an absolutely fluid tight joint.

In practice the standing valve is seated in position after the working barrel is in place in the well. The working barrel 1 having been lowered into position the standing valve is lowered thereinto, said valve being suspended from the plunger 18 by the usual rod 19, see Fig. 5, and said plunger being lowered into position by the usual sucker rod, not shown. The standing valve first seats into the shoe by engagement of the tapering ring 4 with the tapering seat 5 on the shoe, this giving a positive outside seat for the valve. The sucker rod and plunger are then allowed to drop, driving the valve home and expanding the sleeve 6 to give a tight and rigid connection. When it is desired to dislodge the standing valve it is only necessary to pull up on the sucker rod so as to cause the rod 19 to be lifted by engagement of a head 19′ thereon with the lower end of the plunger, thereby jarring the tapering portion 7 of the valve body out of tight engagement with the expansion sleeve 6, and also jarring said sleeve out of the recess in the shoe, whereupon the standing valve may be raised out of the working barrel.

What we claim is:

1. The combination with the shoe of a working barrel having a tapering recess and provided with an upward extension from said tapering recess, a sliding ring having a tapering face adapted to seat in said recess, an expansion sleeve of deformable metal above said ring, and a standing valve body extending through said ring and sleeve and having a tapering portion for engaging said sleeve to expand the same.

2. The combination with the shoe of a working barrel having a tapering recess and provided with an upward extension from said tapering recess, a sliding ring having a tapering face adapted to seat in said recess, an expansion sleeve of deformable metal above said ring, a standing valve body extending through said ring and sleeve and having a tapering portion for engaging said sleeve to expand the same, and means on the lower end of said valve body for engaging the tapering ring to hold the same in position while the valve is being inserted.

In testimony whereof, we have hereunto set our hands at Los Angeles, California this 7th day of March, 1912.

DANIEL DANIELS.
LYSLE P. BURGESS.

In presence of—
ARTHUR P. KNIGHT,
GLADYS RUSSELL.